United States Patent Office 2,729,646
Patented Jan. 3, 1956

2,729,646

2-THIONOCARBONYLHYDRAZIDES OF (CARBOXYMETHYL)QUATERNARY AMMONIUM SALTS AND METHOD

Hein L. Klopping, Wilmington, Del., assignor to E. I. du Pont de Nemours and Company, Wilmington, Del., a corporation of Delaware No Drawing. Application September 8, 1952, Serial No. 308,530

6 Claims. (Cl. 260—294.8)

This invention relates to 2-thionocarbonylhydrazides of (carboxymethyl)quaternary ammonium salts and to a method for their preparation.

The 2-thionocarbonylhydrazides of (carboxymethyl) quaternary ammonium salts of the invention conform to the formula (1) 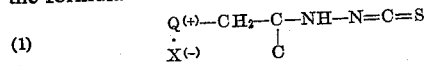

in which Q is a quaternary ammonium radical and X is chlorine or bromine, the nitrogen atom of the quaternary ammonium radical being linked directly to the carbon atom of the methylene group and also to halogen.

The compounds of my invention may contain any of a variety of quaternary ammonium radicals. They may contain pyridinium or a trialkylammonium radical such as, for instance, trimethylammonium or triethylammonium. Compounds containing a tri-(lower alkyl) ammonium radical or pyridinium radical are preferred.

As examples of the 2-thionocarbonylhydrazides of (carboxymethyl) quaternary ammonium salts of my invention there may be mentioned:

(Carboxymethyl)trimethylammonium chloride, 2-thionocarbonyl hydrazide
(Carboxymethyl)triethylammonium bromide, 2-thionocarbonyl hydrazide
(Carboxymethyl)tri-n-propylammonium chloride, 2-thionocarbonly hydrazide
(Carboxymethyl)pyridinium chloride, 2-thionocarbonyl hydrazide A method for the production of the compounds can be represented by the following chemical equation:

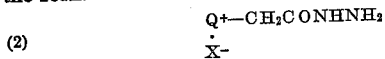

where X is bromine or chlorine and Q is a quaternary ammonium radical.

The aminoacetohydrazide hydrohalides represented by the formula (2) $Q^+ - CH_2CONHNH_2$
    $X^-$ and shown in the above equation as the starting material for the preparation of the compounds of the invention are preferably Girard's "T" reagent or "Girard's "P" reagent.

Both of these reagents are commercially available. Girard's "T" reagent (trimethylaminoacetohydrazide hydrochloride, also known as betaine hydrazide hydrochloride) can be readily prepared by reacting ethyl chloroacetate and trimethylamine with hydrazine hydrate by the procedure described on page 85 of "Organic Syntheses," Collective Volume 2, John Wiley & Sons, Inc., New York, 1943.

Girard's "P" reagent can be prepared in a manner identical with the method employed for preparing Girard's "T" reagent with the exception that pyridine is substituted for trimethylamine. Girard's "P" reagent may be represented graphically by Formula 2, where $Q^{(+)}$ is a pyridinium radical.

Other aminoacetohydrazide hydrohalides of Formula 2 are similarly prepared by reacting a tertiary or heterocyclic amine and ethyl chloroacetate with hydrazine hydrate.

The reaction between the aminoacetohydrazide hydrohalide of Formula 2 and thiophosgene to produce the compounds of the invention is most readily effected in the presence of an aqueous solution of a mineral acid. Hydrochloric acid is a preferred mineral acid.

The temperature of the reactants should be maintained below 25° C. during the mixing of the thiophosgene and aminoacetohydrazide hydrohalide.

Usually a reaction of from about 1 to 5 or 6 hours is required, but in some instances the reaction may go to completion within a short time.

The 2-thionocarbonylhydrazides of (carboxymethyl) quaternary ammonium salts of the invention are useful in the protection of organic materials, plants and vegetable crops against fungal attack.

In order to better understand my invention, reference should be had to the following illustrative examples:

Example 1

Preparation of (carboxymethyl)trimethylammonium chloride, 2-thionocarbonylhydrazide

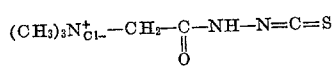

A solution of 33.4 grams of Girard's "T" reagent in 100 ml. of water is mixed with 20 ml. of concentrated hydrochloric acid and 15.2 ml. of thiophosgene. The reaction mixture is stirred for a period of 5 hours, while its temperature is maintained below 25° C. A white crystalline precipitate forms. This precipitate is filtered with suction and collected. More of the product is obtained by evaporating the filtrate to a small volume in a vacuum. The successive crops of product are combined and washed with acetone. The product, which is (carboxymethyl)trimethylammonium chloride, 2-thionocarbonylhydrazide, is finally ground in a mortar with acetone, filtered, collected and dried. The white crystals melt at 215–220° (decomp.) and weigh 32 grams.

*Analysis.*—Calculated for $C_6H_{12}ON_3SCl$: C, 34.36; H, 5.77; N, 20.04; S, 15.29. Found: C, 34.37; H, 5.73; N, 19.68; S, 15.06.

Example 2

Preparation of (carboxymethyl)pyridinium chloride, 2-thionocarbonylhydrazide

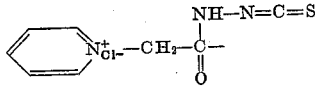

A solution of 18.7 grams of Girard's "P" reagent in 50 ml. of water is mixed with 10 ml. of concentrated hydrochloric acid and 7.6 ml. of thiophosgene. The mixture is stirred for a period of 5 hours, the temperature being kept below 25° C. Then the reaction mixture is cooled in ice water, and the white crystals which separate are collected on a filter. The filtrate is evaporated to a small volume in a vacuum, yielding a second crop of product. The combined crops are washed with acetone and dried. The dried white crystalline product consisting of (carboxymethyl)pyridinium chloride, 2-thionocarbonylhydrazide, melts at 213–220° C. (decomp.) and weighs 12 grams.

I claim:
1. A compound having the formula

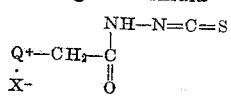

where Q+ is a quaternary ammonium radical of the class consisting of tri (lower alkyl) ammonium and pyridinium groups, and X is a halogen of the group consisting of chlorine and bromine, the nitrogen atom of the quaternary ammonium radical being linked directly to the carbon of the methylene group and also to halogen.

2. (Carboxymethyl)trimethylammonium chloride, 2-thionocarbonylhydrazide.

3. (Carboxymethyl)pyridinium chloride, 2-thionocarbonylhydrazide.

4. In a process for preparing a compound having the formula

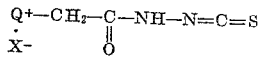

where Q+ is a quaternary ammonium radical of the class consisting of tri (lower alkyl) ammonium and pyridinium groups, and X is a halogen of the group consisting of chlorine and bromine, the nitrogen atom of the quaternary ammonium radical being linked directly to the carbon of the methylene group and also to halogen, the step which comprises reacting thiophosgene with a compound of the formula

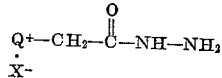

where Q and X have the same significance as above in the presence of a mineral acid.

5. In a process for preparing (carboxymethyl)trimethylammonium chloride, 2-thionocarbonylhydrazide, the step comprising reacting an aqueous solution of (carboxymethyl) trimethylammonium chloride hydrazide with thiophosgene in the presence of hydrochloric acid.

6. In a process for preparing (carboxymethyl) pyridinium chloride, 2-thionocarbonylhydrazide, the step comprising reacting an aqueous solution of 1-(carboxymethyl)-pyridinium chloride hydrazide with thiophosgene in the presence of hydrochloric acid.

References Cited in the file of this patent
UNITED STATES PATENTS 2,045,132  Girard et al. ............ June 23, 1946
2,626,258  Ward ................... Jan. 20, 1953